J. VOLLMER & R. S. TALBOT.
APPARATUS FOR MAKING BISULFITE LIQUOR.
APPLICATION FILED MAR. 27, 1908.

945,426.

Patented Jan. 4, 1910.

2 SHEETS—SHEET 2.

WITNESSES:

INVENTORS:
John Vollmer
Reginald S. Talbot
By
their attorneys.

UNITED STATES PATENT OFFICE.

JOHN VOLLMER, OF BOSTON, MASSACHUSETTS, AND REGINALD S. TALBOT, OF APPLETON, WISCONSIN.

APPARATUS FOR MAKING BISULFITE LIQUOR.

945,426.  Specification of Letters Patent.  Patented Jan. 4, 1910.

Application filed March 27, 1908. Serial No. 423,534.

*To all whom it may concern:*

Be it known that we, JOHN VOLLMER, of Boston, in the county of Suffolk and State of Massachusetts, and REGINALD S. TALBOT, of Appleton, in the county of Outagamie and State of Wisconsin, both citizens of the United States, have invented a new and useful Improvement in Apparatus for Making Bisulfite Liquor, of which the following is a specification.

In preparing acid for the sulfite process the gas given off from the burning sulfur is ordinarily mixed with milk of lime by which it is taken up and the two in liquid form are conveyed to the digester containing the chips upon which the sulfurous gas is to act to make a wood pulp.

The purpose of our invention is to provide an economical and simple means for insuring the thorough absorption of the products of the sulfur furnace so that there shall be practically no waste, the apparatus itself being such that the chance for its disintegration is minimized and such wear as is ordinarily caused where moving parts are used is absent. It is necessary that such tanks shall be air-tight and shall be made of material non-corrosive, hence the tanks below described are made of wood inclosed in cement, the cement serving to prevent the leakage of air in places where the wood lining shows any tendency to shrink. It is also desirable for the best results that during the process of mixing, the liquid and gas shall be kept cool, and for this purpose we have shown means whereby the uniting fluids and gases in the tanks are chilled to any desirable degree. In order to secure circulation and to assist in the mixing operation we cause the milk of lime to flow through the apparatus by gravity and the gas to be drawn through the milk of lime for mixing purposes by a vacuum or under pressure. We prefer a vacuum process and hence have shown apparatus constructed especially to use it.

Our invention will be understood by reference to the drawings, in which—

Figure 1:
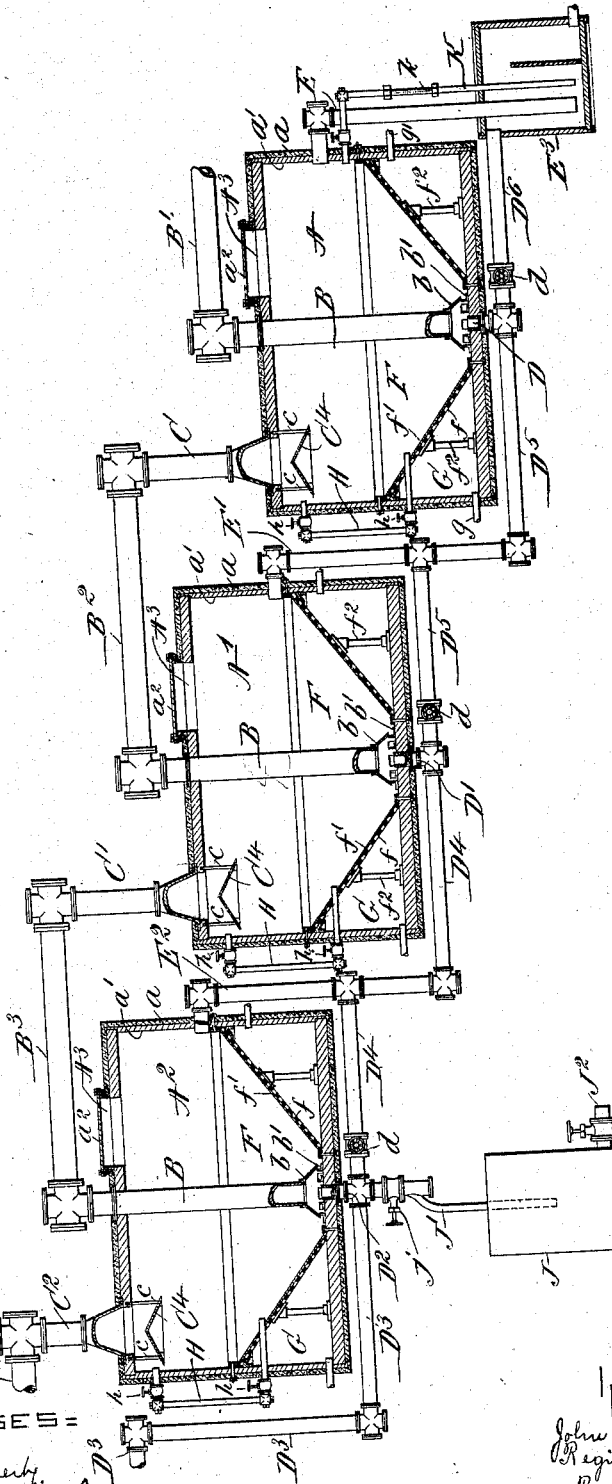
Figure 2:
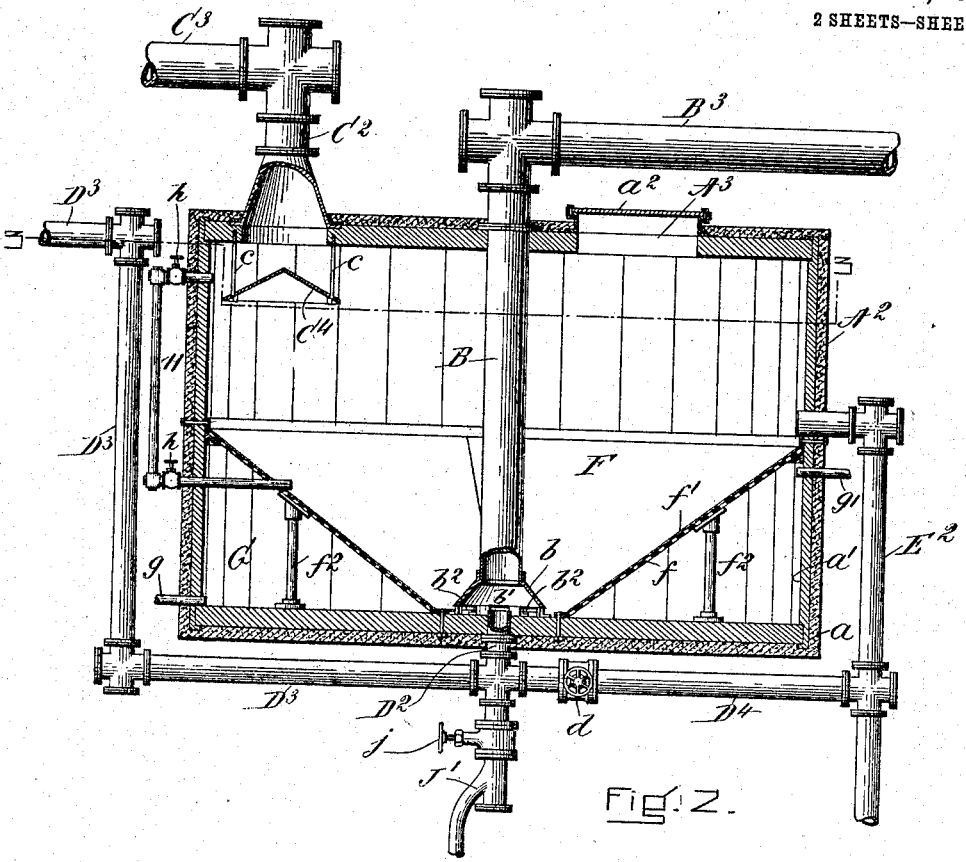
Figure 3:
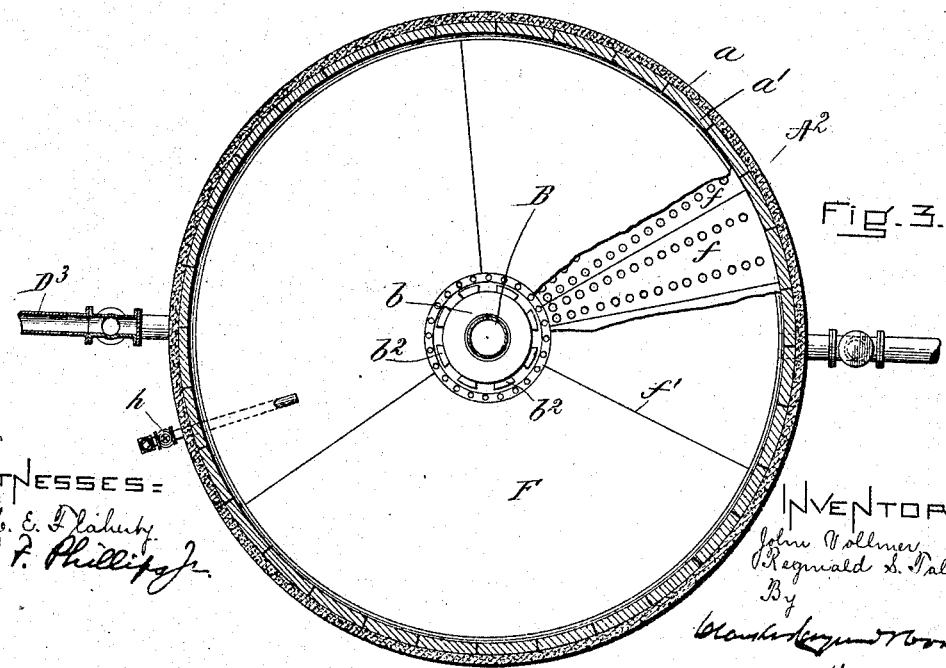

Figure 1 is a sectional elevation showing the arrangement and connections of a series of three tanks embodying our invention, the tanks being shown more or less diagrammatically. Fig. 2 is an enlarged section of one of the tanks $A^2$, and Fig. 3 is a horizontal section on line 3—3 of Fig. 2 showing the false bottom partly broken away.

The tanks are lettered A, $A^1$ and $A^2$, respectively, and are similar in character. Each tank comprises a wooden structure $a^1$ inclosed in cement $a$, the two being made to adhere in any desired way. The tanks may be made of staves in the ordinary way of making cylindrical tanks or the like and are closed in at the top so as to be air-tight. An opening $A^3$ in the top of the tank is closed by a cover $a^2$ made air-tight by screws or in any other convenient manner. Each tank is provided with a vertical gas inlet pipe B which spreads at its bottom into a bell-like distributer $b$ forming within it a chamber $b^1$ and having openings $b^2$ which connect the chamber with the tank at the level of its floor as shown. Each pipe B extends up through the top of the tank and the pipe B of tank A is connected by the pipe $B^1$ with a suitable gas supply. From the top of the tank A leads a pipe C which is connected with the pipe B of tank $A^1$ by means of the pipe $B^2$. In a similar way the tank $A^1$ is connected with the gas inlet B of tank $A^2$ by means of an upright pipe $C^1$ and a connecting pipe $B^3$. The tank $A^2$ is connected at the opening $C^2$ by the pipe $C^3$ with a vacuum pump or other means of insuring the movement of the gas from its source through the system. Under the openings for the pipes C, $C^1$ and $C^2$ are hung deflectors $C^4$ by means of rods $c$, the deflectors and rods being made of non-corrodible metal. Their purpose will be explained below.

To supply milk of lime to the system we have shown an opening in the bottom of each tank into which leads a pipe D, $D^1$, $D^2$. The pipe $D^2$ serving the tank $A^2$ is supplied with milk of lime from a suitable supply tank from which leads the pipe $D^3$. A continuation $D^4$ of this pipe extends past the pipe $D^2$ to a point where it connects with an overflow $E^2$ from tank $A^2$ and from thence it passes along with suitable couplings to the inlet $D^1$ of tank $A^1$. In a similar manner its extension $D^4$ passes to a point of connection with the outlet $E^1$ of tank $A^1$, thence as $D^5$ on to the inlet pipe D of tank A from which point as $D^6$ it empties into the receiving tank $E^3$ which is shown diagrammatically, that is, out of proportion. Into this tank also empties the overflow E from the tank A. Each tank has preferably a conically shaped floor as and for the purposes described.

The apparatus so far described operates as follows: Milk of lime being supplied through the pipe $D^3$ and gas being supplied through the inlet $B^1$ and a vacuum being established at the end of the pipe $C^3$ the milk of lime first fills the tanks to a point approximately at the level of the overflow pipes E, $E^1$, $E^2$. The gas which enters through the pipe $B^1$ passes down through the pipe B in tank A and there meets the incoming stream of milk of lime in the chamber $b^1$. From this chamber the mixture rushes out through the openings $b^2$ with a force due not only to the gravity flow of the liquid and the gas pressure but also to the vacuum and striking the floor F shoots up it with considerable force against the walls and top of the tank thus largely increasing the surface area when absorption takes place. Thus a spray is formed in the top of the tank which assists materially in the chemical combining of the gas and liquid so that opportunity is offered for the liquid to take up a large part of the free gas. Moreover the vacuum assists in the ebullition of the body of the liquid so that the gas becomes very thoroughly mixed without, and coming into very thorough contact with it, is absorbed by it to a very large extent. What is not taken up in tank A passes over to the tank $A^1$ through the pipe C where the same process goes on and any surplus is carried over into the tank $A^2$ so that all three of these tanks contain milk of lime in a greater or less degree of ebullition according to the vacuum, the milk of lime in each absorbing so far as possible the free gas which enters the tank. When the process is well under way it will be seen that the tank $A^2$ will contain liquor with a small amount of gas, tank $A^1$ liquor having a larger proportion of gas, while tank A will contain liquor approximately saturated therewith. The valves $d$ are ordinarily closed and the pipe $E^2$ carries the overflow from tank $A^2$ by the pipe $D^4$ to the pipe $D^1$ from which it flows into the next tank $A^1$ below it in series where in the same way it absorbs the free sulfurous gas so that the liquor has a constant opportunity to add to that which it already has. From thence it passes over through the overflow $E^1$ and pipes $D^5$ and D to the tank A and after passing through this tank and absorbing gas there overflows into the tank $E^3$ when it is ready for use and from which it is drawn to the storage or receiving tank. It will be noted that in each case the incoming milk of lime is in the first place thrown directly into and against the incoming stream of gas and the interior of the cone forms a chamber which acts in the first instance to confine the gas and milk of lime and cause them to intermingle so that here is the first opportunity for combining, additional opportunity being offered by reason of the vacuum or reduced pressure in the upper part of the tank which encourages the spraying process above described and causes the free gas in the liquor to bubble up through it so that it is given opportunity to absorb a considerable portion of the gas. Thus by the time the process has ceased, that is, by the time the liquid leaves the tank A the milk of lime is practically saturated with gas. We have found that by this means one volume of milk of lime will dissolve or take up more volumes of sulfurous acid ($SO_2$) than by any other system, the reason being first because of the confinement of the two in the chamber $b^1$ and the division of the liquid into streams as it passes out through the openings $b^2$, then by its spraying in the top of the tank and by the tendency of the gas while free to bubble up through the liquid so that it breaks up the body of liquid and spreads through it.

We have found that it is desirable to shield the openings in the top of the tanks by deflectors $C^4$ in order to prevent the liquid being drawn through the vacuum system.

It will be noted that the pipes $D^3$, $D^4$ and $D^5$ contain valves $d$ which are only opened when it is desired to empty the tanks.

But in addition to the causes for a superior chemical absorption resulting from the process which we have above described we have provided further means by which a thorough absorption of the gas by the milk of lime is secured and that is by means of a cooling device which serves to keep the contents of the tanks at any desired temperature. It is well known that the lower the temperature of a liquid the larger the amount of gas it will absorb. In order to utilize this law and maintain the contents of the tanks at any desired temperature we prefer to make our tanks with a conical false bottom below which is a cooling chamber. For this purpose we provide a truncated cone F comprised of two layers, the lower layer $f$ being preferably a layer of perforated iron, the perforations being considerable in number but not enough to so materially weaken the iron that it will not support the load above it, and the upper layer being of lead $f^1$ or other metal which will not be corroded by the contents of the tank. The perforations serve to bring the chilling fluid into closer relation to the contents of the tank than if the perforations did not exist; the iron thus serving to support the lead without materially interfering with the chilling of the contents of the tank.

We prefer to use standards $f^2$ suitably located which shall assist in supporting and strengthening the cone F so that it may hold its load properly. The cone F forms a chamber G in the bottom of the tank, which chamber is water-tight—that is, the connections between the cone and the tank are of such a character as not to allow any leakage from the interior of the tank into the chamber G. This chamber G we provide with water at a given temperature through the pipe $g$, an outlet $g^1$ being provided so that circulation may be kept up and the temperature be maintained at any desired degree. By this means the contents of each tank may be kept at the same temperature or the temperature may be varied as occasion may required. We also provide for each tank a gage H of the usual type by means of which the height of the liquid in each tank may be seen and to a certain extent the activity of the contents of the tank may be watched. These gages are provided with valves $h$ by means of which at any time they may be cut off from the tank. We also prefer to provide a sand trap J which is connected with the tank $A^2$ through the pipe $D^2$ by means of the pipe $J^1$ which leads from the coupling from which the pipe $D^2$ projects and is controlled by valve $j$. Ordinarily this valve is open to allow impurities to be discharged into the sand box, the vacuum being sufficiently strong to hold up the liquor in the pipes and draw it into the tank $A^2$ rather than let it escape into the sand box. This sand box has a washout opening at $J^2$ also controlled by a valve. The tank A also is provided with an outlet K leading into the storage tank $E^3$ from a point below the overflow E and having a glass section $k$ to allow the overflow to be inspected. By this the character of the product can be determined.

The operation of our apparatus will be understood from what has been said above. Its advantage lies first in its construction, in that the wood of which each tank is made is non-corrosive and while it may shrink it is backed up at the points where a woden tank would naturally be leaky, (that is, where it is not at all times in contact with the liquid,) with cement whereby it is maintained air tight. In the same way the pipe connections are always rendered perfect because they may be cemented in place, the cement uniting with the cement of the tank. Our apparatus has another advantage in that the agitation in the tank is not caused by a mechanical agitator which being a movable part is liable to require constant attention and lubrication and also the application of power in some form. It is caused by the movement of the gas itself and the manner in which the gas and the milk of lime are brought together, the gas being forced in under more or less pressure into a confined chamber, and at the same time are driven up by the conical floor and sprayed in the top of the tank, any free gas being drawn up through the liquor by the vacuum. We thus get all the advantages of what is known as the spraying system with the additional advantages of the mechanical mixture by an agitator, the agitation being secured by the reduced pressure in the top of the tank which causes any free gas to bubble up through the liquor and subdivide its bulk— the liquor being kept cool so that the gas and liquor which have once united will not tend to separate.

We do not mean to confine ourselves to the use of a vacuum for the purpose of causing circulation as of course gas pressure will to a certain extent accomplish the same result and it will be seen by one skilled in the art that modifications of this apparatus may be had without departing from the spirit of the invention.

While we have described our invention as an apparatus for making bisulfite liquor it is of course plain that it may be useful in any case where the absorption of a gas by a liquid is intended.

What we claim as our invention is:—

1. The tank above described having a distributer located at the bottom thereof and connected therewith and a gas inlet and a liquid inlet connected with said distributer to deliver gas and liquid thereinto as described.

2. The tank above described having a distributer located at the bottom thereof, connections to supply said distributer with gas and liquid and connections between said distributer and the interior of said tank whereby the contents of said distributer will be delivered into the lower part of said tank as described.

3. The tank above described having a distributer located at the bottom thereof, connections to supply gas and liquid to said distributer, said distributer having a restricted outlet whereby the gas and liquid received in said distributer will be confined and delivered therefrom under pressure as set forth.

4. The tank above described having a distributer located at the bottom thereof and comprising a gas inlet and a liquid inlet, said inlets being located opposite to each other whereby their streams of liquid and gas moving in opposite directions will be discharged into each other and the combined gas and liquid will flow into the tank at the bottom thereof.

5. The tank above described having a gas inlet and an oppositely discharging liquid inlet disposed beneath said gas inlet, an enlarged extension to said gas inlet surrounding said liquid inlet and forming a chamber, and narrow apertures in said extension to said gas inlet.

6. The tank above described having a gas inlet and an oppositely discharging liquid inlet, said gas inlet terminating in an enlarged extension surrounding said liquid inlet and having narrow apertures leading into said tank and means surrounding said extension whereby the liquor passing through said apparatus will be directed upward through the contents of the tank as described.

7. The tank above described having a gas inlet and an oppositely discharging liquid inlet, said gas inlet terminating in an enlarged extension surrounding said liquid inlet and having narrow apertures leading into said tank, a restricted outlet into said tank whereby the liquid and gas will pass from said extension under pressure, and means surrounding said extension whereby the liquor passing through said apparatus will be directed upward through the contents of the tank as described.

8. The tank above described having a gas inlet and a liquid inlet, and a direction changing floor whereby the inflow of liquid and gas will be directed upwardly, and means for reducing the pressure in the tank whereby the cohesiveness of the liquid is reduced and the gas is brought into intimate contact with the particles thereof, as set forth.

9. In a gas absorbing system, a series of tanks, a gas inlet and liquid inlet located near the bottom of each tank, an outlet at the top of each tank whereby free gas may pass therefrom, means for causing a circulation of gas throughout said system and a deflector located in proximity to said outlet whereby the effervescing liquid will be prevented from entering said outlet.

10. The tank above described having a gas inlet and a gas outlet, a conical false bottom and a chamber located below said false bottom adapted to contain a cooling liquid, as described.

11. The tank above described having a false bottom comprising a perforated strengthening layer and a superposed imperforate layer of non-corrosive metal, whereby the non-corrosive layer will be given adequate support and the temperature of the chamber below the false bottom will be substantially imparted to the chamber above the bottom without the intermingling of the contents of the two chambers.

12. In a gas absorbing system, a series of tanks connected to draw gas therethrough and having a gravity system to supply liquid thereto, each tank being provided with an overflow connected with the bottom of the next tank in series whereby the liquid containing absorbed gas is delivered into the bottom of the next tank in series, and means for delivering a further supply of gas into said liquid as it enters said tank.

13. In the system above described, a series of tanks, a liquid supply system, and a gas supply system, a member of each system entering each tank at the bottom thereof, means for causing unabsorbed gas to ebulliate through the liquid contents of the tank whereby it is brought into intimate contact with the liquid to be taken up thereby.

14. In the system above described, a series of tanks, a liquid supply system, and a gas supply system, a member of each system entering each tank at the bottom thereof, the end of each gas system member terminating in a chamber having a restricted outlet, the end of each liquid system member also terminating in said chamber whereby said liquid and gas are brought into intimate contact, means for causing unabsorbed gas to ebulliate throughout the liquid contents of the tank as described.

15. In a system of tanks adapted for the purposes set forth, liquid and gas inlets and means in one or more of said tanks for mixing said liquid and gas, comprising a chamber with constricted outlets, a deflecting floor for changing the direction of said liquid and gas as they flow from said chamber, and a means for reducing pressure above the normal level of the liquid in each tank whereby the liquid is agitated by said gas and sprays in the upper portion of each tank thus coming in immediate contact with said gas, as described.

16. In an apparatus for making bisulfite liquor, a tank having a gas and liquid inlet at the bottom thereof and a conical partition surrounding said gas and liquid inlet and forming a false bottom to said tank whereby a chamber is formed in the bottom of said tank, said false bottom being constructed of a layer of non-corrodible material, and a perforated layer of supporting material located therein and adapted to strengthen said non-corrodible material, said false bottom forming a chamber adapted to receive means for changing the temperature of the contents of said tank, as described.

JOHN VOLLMER.
REGINALD S. TALBOT.

In the presence of—
F. F. PHILLIPS, Jr.,
M. E. FLAHERTY,
JOHN E. SCANLON,
W. B. WRIGHT.